United States Patent [19]

Schoonover

[11] Patent Number: 4,553,458
[45] Date of Patent: Nov. 19, 1985

[54] METHOD FOR MANUFACTURING HEAT TRANSFER ELEMENT SHEETS FOR A ROTARY REGENERATIVE HEAT EXCHANGER

[75] Inventor: John M. Schoonover, Wellsville, N.Y.

[73] Assignee: The Air Preheater Company, Inc., Wellsville, N.Y.

[21] Appl. No.: 594,155

[22] Filed: Mar. 28, 1984

[51] Int. Cl.⁴ .................. B23Q 15/12; B26D 5/20
[52] U.S. Cl. .................................... 83/33; 83/42; 83/71; 83/210; 83/371
[58] Field of Search .............. 83/33, 42, 210, 371, 83/364, 71

[56] References Cited

U.S. PATENT DOCUMENTS

| 3,868,877 | 3/1975 | Shoji et al. | 83/371 X |
| 3,933,069 | 1/1976 | Tall et al. | 83/371 X |
| 4,034,973 | 7/1977 | Hams | 83/371 X |
| 4,056,024 | 11/1977 | Baert et al. | 83/371 X |
| 4,436,008 | 3/1984 | Strunc | 83/42 |

Primary Examiner—Donald R. Schran
Attorney, Agent, or Firm—William W. Habelt

[57] ABSTRACT

Sheets (10a,10b) of heat transfer element (12) for stacking in an element basket (50) of a rotary regenerative heat exchange are cut in such a manner that the spacing notches (24) formed in the element sheets (10a,10b) cannot nest when the element sheets are arranged in juxtaposition within an element basket (50).

1 Claim, 6 Drawing Figures ced notches, preferably equal to one-half of that interval. Although such a cutting process does insure that juxtaposed subsheets will not nest when stacked in an element basket, a substantial amount of material is wasted when the first and second sheets are cut from a continuous sheet of material.

METHOD FOR MANUFACTURING HEAT TRANSFER ELEMENT SHEETS FOR A ROTARY REGENERATIVE HEAT EXCHANGER

BACKGROUND OF THE INVENTION

The present invention relates to a method for manufacturing heat transfer element sheets from a roll of sheet material for stacking within an element basket of the type typically utilized in a rotary regenerative heat exchanger. More particularly, the present invention relates to a method for manufacturing the heat transfer sheets to facilitate stacking within the element basket wherein the cutting of the sheet material is controlled to produce sheets which when stacked alternately in juxtaposition within the element basket will not nest.

A typical rotary regenerative heater has a cylindrical rotor divided into compartments in which are disposed sheets of heat transfer element supported in various element baskets mounted in the rotor. The element baskets comprise open-ended housings such as, but not limited to, the element baskets disclosed in U.S. Pat. Nos. 2,432,198; 3,314,472; and 3,379,340. As the rotor turns, the heat transfer element sheets disposed in the element baskets are alternately exposed to a stream of heating gas and then upon rotation of the rotor to a stream of cooler air or other gaseous fluid to be heated. As the heat transfer element sheets are exposed to the heating gas, they absorb heat therefrom and then when exposed to the cool air or other gaseous fluid to be heated, the heat absorbed from the heating gas by the heat transfer element sheets is transferred to the cooler gas.

Typically, the heat transfer element sheets are closely stacked in spaced relationship within the element basket to provide a plurality of passageways between juxtaposed plates for the flow of the heat exchange fluid therebetween. Typically, the heat transfer element sheets are crimped at frequent and generally equally spaced intervals to provide notches which extend outwardly from the sheet for spacing the stacked sheets from each other. The spacers formed in the heat transfer element sheet may be single-lobed notches extending outwardly from the sheet in one direction or double-load notches extending outwardly from the sheet in opposite directions as shown in U.S. Pat. No. 2,596,642, or the spacers may comprise a plurality of dimples formed in the sheet as disclosed in U.S. Pat. No. 4,363,222. When the sheets are stacked together in juxtaposition within the element basket, these notches or spacers serve not only to maintain adjacent sheets at their proper spacing, but also to provide support between adjacent sheets so that the force that is placed on the sheets by the flow of heating fluid through the baskets, and also the flow of pressurized cleaning gas through the baskets, can be equilibrated between the various sheets making up the heat transfer element assembly housed within the basket.

In forming the heat transfer element basket assemblies, the heat transfer element sheet material is drawn from a coil by a continuous rolling process and passed through at least one press which crimps the notches or spaces into heat transfer element sheet. The individual sheets are then cut sequentially from the notched sheet. As the element baskets are typically in the form of an open-ended right trapazoidal prism, each of the individual sheets will be of a different length so that when the inidividual sheets are stacked endwise within the element basket, they will fit snugly therein. As the individual sheets are cut from the roll of sheet material, they are placed endwise in the element basket in juxtaposition with each other.

Because of the varying length of the individual sheets, it typically occurs in the typical prior art cutting process that one or more of the sheets making up the heat transfer element basket assembly will be cut at a length such that its notches coincide with the notches of an adjacent sheet. This results in the notches in the adjacent sheets nesting thereby destroying the spacing between the two sheets. When this occurs, the operator must stop the cutting process and hand operate the machine to cut a new plate to substitute for one of the nesting plates in such a manner that the notches will not line up. After this has been accomplished, the operator may reinitiate the automatic cutting process. However, the shutting down of the automatic process and the hand cutting of a replacement sheet can be a timely and therefor costly endeavor.

A recently developed process for automatically cutting heat transfer element sheets in such a manner as to preclude the possibility of nesting between adjcent sheets when the sheets are stacked in the element basket is disclosed in assignee's co-pending application, Ser. No. 487,553, filed Apr. 22, 1983. As disclosed therein, the cutting process is controlled such that a plurality of first sheets are cut from the notched sheet of material so that each of the first subsheets has a leading edge sheared along a first line spaced a fixed distance from the nearest notch therein and so that each of the second subsheets has a leading edge sheared along a second line spaced a fixed distance from the nearest notch therein, the fixed distances being different by a fixed amount equal to a fraction of the interval between the equally spaced notches, preferably equal to one-half of that interval. Although such a cutting process does insure that juxtaposed subsheets will not nest when stacked in an element basket, a substantial amount of material is wasted when the first and second sheets are cut from a continuous sheet of material.

SUMMARY OF THE INVENTION

The present invention provides a controlled procss for cutting heat transfer element sheets in such a manner so as to preclude nesting between adjacent sheets when stacked in the element basket, while permitting the sheets to be cut in order from a continuous sheet of material with a minimum wastage of material.

In accordance with the present invention, the cutting process is controlled through continuously monitoring the position of an upstream notch relative to the line along which the shears cut the leading edges of the element subsheets so that an offset of at least a preselected minimum amount is always maintained between notches of sequentially cut element subsheets. The leading edge of the first subsheet is cut along a first line and the position of a particular upstream notch, for instance, the first upstream notch, relative to the first line along which the leading edge was cut is detected and stored. The material is then advanced by an amount equal to the desired length of the first subsheet and a trailing edge is cut along a second line. The position of the upstream notch in the next subsheet to be cut, corresponding to the particular upstream notch in the subsheet just cut, relative to the second line along which the trailing edge is cut is now detected. The difference in the distances of the two detected notches from their respective reference lines is then calculated and compared to a preselected minimum tolerance indicative of the least acceptable offset between notches of neighboring element subsheets that ensures no nesting of notches in adjacent subsheets when stacked in the element basket.

If the calculated difference is at least equal to the preselected minimum tolerance, the trailing edge just cut along line 80 on the preceding subsheet coincides with the leading edge on the next subsheet to be cut. In this case, the sheet of material is merely advanced an amount equal to the desired length of the next subsheet and the shears are activated to cut a trailing edge on this subsheet.

If, however, the calculated difference is less than the preselected minimum tolerance acceptable, the sheet of material is advanced by a slight amount sufficient to ensure that the upstream notch is moved to a new position where at the calculated difference is now at least equal to the preselected minimum tolerance. The shears are then activated to cut a leading edge on the next subsheet along a line spaced from the line along which the trailing edge was cut on the preceding subsheet by a fairly small amount. This material intermediate the trailing edge of the preceding subsheet and the leading edge newly cut on the next subsheet is wastage which is discarded. The newly cut leading edge now becomes the reference line for determining notch location, the sheet of material is advanced to the desired length of this subsheet, the shears activated to cut a trailing edge on this subsheet, and the comparison process with subsequent controlled cutting repeated until the element basket is filled.

BRIEF DESCRIPTION OF THE DRAWINGS

A more complete understanding of the invention, and a better realization of the objects fulfilled by the invention, may be realized by referring to the following description of a preferred embodiment in conjunction with the accompanying drawing in which.

DESCRIPTION OF A PREFERRED EMBODIMENT

Figure 1:
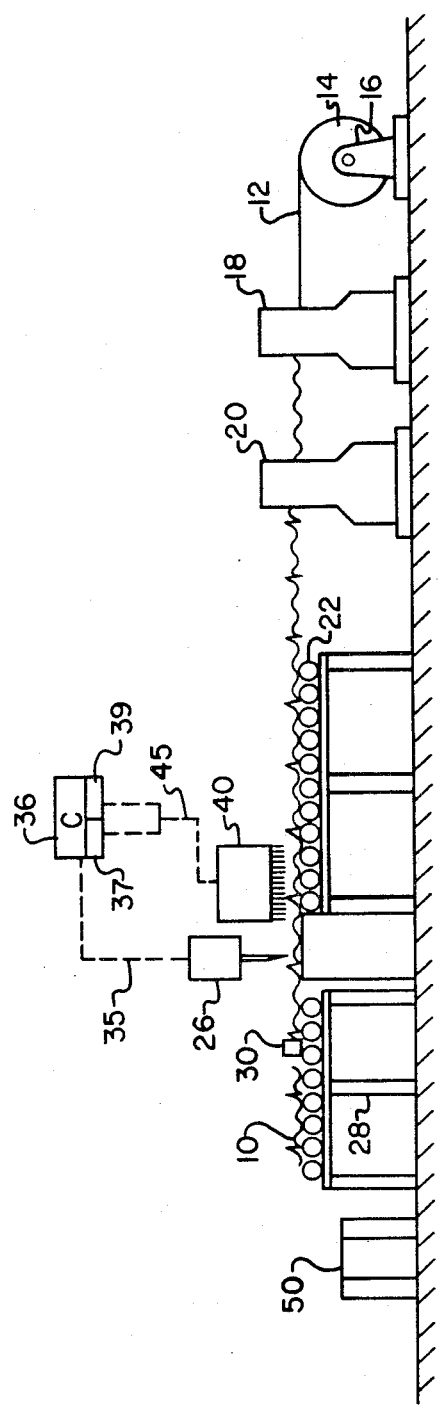
FIG. 1 is a diagrammatic side elevation view of a manufacturing assembly line embodying the present invention.

Referring now to the drawing, and more particularly to FIG. 1, there is depicted therein an assembly line of apparatus for cutting the individual heat transfer element sheets 10 from a continuous sheet 12 of each transfer element material for subsequent assembling within an element basket 50 disposed at the end of the assembly line. To begin the manufacturing process, a continuous sheet 12 of the particular heat transfer element material from which the individual element sheets 10 are to be cut is drawn from a material roll 14 which is rotatably held on a support 16 whereby the material may be unrolled by a relatively light pull on the material and supplied to the forming presses 18 and 20, or supplied directly to the feeder rolls 22 if the continuous sheet 12 has been previously notched.

The forming presses 18 and 20 are actuated independently by means not illustrated to impart to the continuous sheet 12 a particular surface impression as the material passes through the presses. Typically, the first roller press 18 would impart a continuous corrugation or undulation to the continuous sheet 12 of heat transfer element material. Most commonly, this would involve imparting to the material a continuous and shallow sine wave-like corrugation. The second forming press 20 is most typically utilized to provide spacer notches in the surface of the element sheet 12. These notches are usually in the form of a single lobe impressed in the material to extend outwardly in one direction or double lobes having one lobe extending outwardly from the upper surface of the material and another lobe extending outwardly from the lower surface of the material. Additionally, other well-known forms of notches may be used. These notches are critical as they serve to properly space apart the heat transfer element sheets 10 when they are placed in juxtaposition within the element basket 50. The heating gas and the gas to be heated will flow through the element basket 50 through the passages 60 established between the juxtaposed element sheets 10. The spacing notches 24 formed in the element sheet 10 serve to maintain the flow passages 60 open.

The corrugated and notched material leaving the forming presses 18 and 20 is then passed by means of feeder rolls 22 to and under a cutting shears 26. The feeder rolls 22 are driven in a well-known manner to pull the continuous sheet of material 12 along the assembly line to the cutting shears 26. The continuous sheet 12 of heat transfer element material is passed under the knife 26 to the gauge table 28. A trigger 30 operatively associated with the gauge table 28 may be moved adjustably along the gauge table 28 to provide a stop against which the material 12 will abut when the amount of material extending beyond the cutting shears 26 to the trigger 30 is equal to the desired length for the particular heat transfer element sheet 10 being cut. The means for adjusting the trigger 30 to give the proper length for the sheet being cut is well-known in the art and will not be described further herein as it does not itself constitute a part of the present invention.

Figure 3:
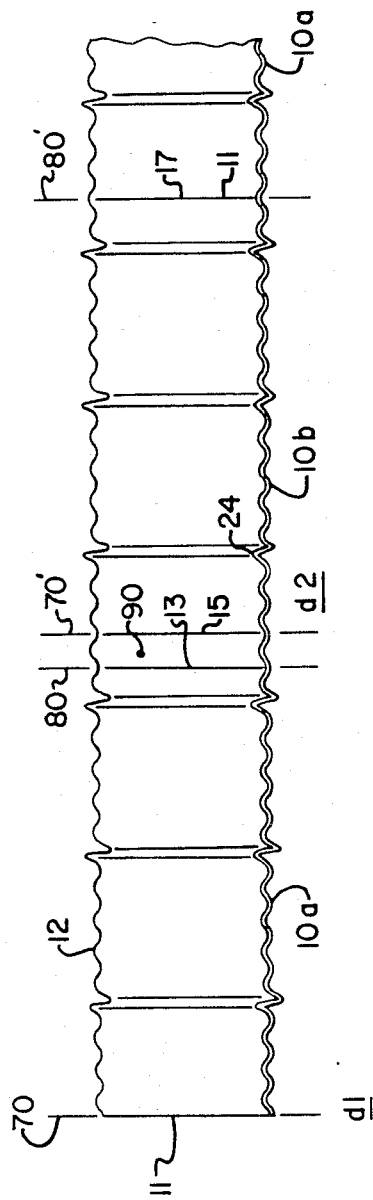
FIG. 3 is a plan view looking down upon the cut heat transfer element leaving the shears on the assembly line of FIG. 1.

Once the trigger 30 has been properly positioned on the gauge table 28 and the continuous sheet of material 12 driven by the feed rollers 22 to abut against the trigger 30, the cutting shears 26 is activated and an individual element sheet 10 is cut from the continuous sheet of material 12. After the element sheet 10 has been cut, the operator will remove the element sheet 10 from the gauge table 28 and insert it endwise in the element basket 50 disposed at the end of the assembly line. The assembly line will continue in operation with individual sheets 10 being cut and then stacked into the element basket 50 until the element basket 50 has been packed fully with juxtaposed element sheets 10 as shown in FIG. 3.

In accordance with the present invention, the cutting process is controlled such that the individual element sheets 10 are cut from the continuous sheet 12 of heat transfer element material in such a manner that the spacing notches 24 formed in the element sheet 12 as it passed through the press 20 cannot nest when the element sheets 10 are arranged in juxtaposition within the element basket 50. To accomplish this objective, a sensor assembly 40 having a plurality of individual sensing elements 42 is disposed upstream of the shears 26 with respect to the movement of the continuous sheet 12. Each of the individual sensing elements 42 of the sensor assembly 40 detects when a notch 24 in the continuous sheet 12 passes thereunder. It is contemplated within the scope of the present invention that any of a number of well-known commercially available sensors may be utilized such as noncontact proximity sensors or any of a number of well-known contact type sensors such as a roller tipped limit switch type sensor will be utilized in carrying out the process of the present invention.

As the continuous sheet 12 of notched heat transfer element material passes from the notch forming press 20 to the cutting shears 26, the sensing elements 42 of the sensor assembly 40 would detect the passage of each notch 24 thereunder. The sensor assembly 40 generates a signal which indicates which of the plurality of sensing elements 42 is in contact with a notch at any given time. Control means 36 monitors the signal generated by the sensor assembly 40, and, when appropriate, sends a control signal 35 to the cutting shears 26 to activate the shears. The process of cutting the heat transfer element 10 from the material 12 is controlled through the control means 36 in accordance with the method of the present invention as will be described hereinafter.

As best seen in FIG. 2, the sensing elements 42 of the sensor assembly 40 are disposed so as to span or very nearly span the distance between adjacent notches on the heat transfer element sheet 12. The notches on the heat transfer element sheet 12 are formed therein at equal intervals a few inches apart, typically three inches apart. In the preferred embodiment of the present invention shown in FIG. 2, the sensor assembly 40 has twenty-five sensing elements disposed one-eighth inch apart so as to span the three-inch spacing between notches. At any given time, one and only one of the sensing elements 42 will be positioned to detect a notch in the continuous sheet 12.

To initiate the cutting process, the continuous sheet 12 of notched sheet transfer element is passed under the shears 26 and the leading edge 11 of the first heat transfer element sheet 10 is cut along a line 70. With the continuous sheet 12 of notched sheet element material positioned under the shears 26 for the cutting of the leading edge 11 of the first heat transfer element 10a, one of the sensing elements 42 of the sensor assembly 40 will be in contact with a notch 24 upstream of the shears 26. The sensor assembly 40 will generate a signal 45 indicating which of the sensing elements 42 is in contact with the notch 24 at this time. As the leading edge of the first heat transfer element sheet 10a is cut, control means 36 will receive at its first register 37 the signal 45 from the sensor assembly 40 indicating which of the sensing elements 42 to the sensor assembly 40 is detecting a notch. Control means 36 will store this information for subsequent use.

After the leading edge 11 has been cut on the first heat transfer element sheet 10a, the continuous sheet 12 of notched heat transfer element material is advanced to abut the trigger stop 30 on the gauge table 28 which has been previously adjusted so that the length of the sheet 12 extending between the trigger stop 30 and the cutting shears 26 will be equal to the desired length of the first heat transfer element sheet 10a. The cutting shears 26 is then again activated to cut the sheet 12 along a line 80 to produce a trailing edge 13 on the first heat transfer sheet element 10a. The first heat transfer element sheet 10a is then ready for packing in the element basket 50.

When the continuous sheet 12 of notched heat transfer element material is positioned against the trigger stop 30 for cutting of the trailing edge 13 on the first heat transfer element sheet 10a, a notch will again be in contact with one of the sensing elements 42 on the sensor assembly 40 upstream of the cutting shears 26. The sensor assembly 40 is now generating a signal 45 which is indicative of which sensing element 42 is now in contact with a notch. Upon the cutting of the trailing edge 13 on the first heat transfer element sheet 10a, the control means 36 receives at its second register 39 the signal 45 from the sensor assembly 40 indicating which sensing element 42 is now detecting a notch 24 on the sheet 12 of heat transfer element material upstream of the shears.

At this point, control means 36 compares the two readings of notch location which it has received from the sensor assembly 40 and calculates the distance between the sensed position of the two notches. Control means 36 will then compare this calculated distance to a preselected minimum distance which must be maintained between consecutive sensed notched location readings in order to insure that nesting between adjacent sheets will not occur. If the calculated distance is greater than the preselected minimum, the trailing edge 13 of sheet 10a will coincide with the leading edge 15 of the next sheet 10b to cut. Therefore, the continuous sheet 12 of heat transfer element material is again advanced to abut the trigger stop 30 on the guage table 28 which has been previously adjusted so that the length of the continuous sheets 12 extending beyond the trigger stop 30 and the cutting shears 26 is equal to the desired length of the second heat transfer element sheet 10b to be cut. Then, the cutting shears 26 is again activated to cut the continuous sheet 12 to provide a trailing edge 17 on the element sheet 10b. The element sheet 10b is then removed from the gauge table 28 by the operator and stacked edgewise in the element basket 50 in juxtaposition to the heat transfer element sheet 10a which had been just previously cut and packed in the element basket 50.

If, however, the calculated distance between the sensed notch locations is less than the preselected minimum value, the continuous sheet 12 of heat transfer element material is advanced a small amount, such as a distance equal to the preselected minimum desired distance between notches. In so doing, the position of the notch in the second sheet 10b under the sensor assembly 40 has been changed such that the notch is now in contact with a different sensing element 42. As the continuous sheet 12 of heat transfer element material has been advanced by a slight amount sufficient to ensure that the calculated distance will now be greater than the preselected minimum desired value, the cutting shears 26 will be activated by the control means 36 to cut the leading edge 15 on the second heat transfer element sheet 10b along a line 70'. A new signal 45 generated by the sensor assembly indicating the position of the notch relative to newly cut leading edge 15 and received by the control means 36 to replace the previous reading indicating the location of the notch in the second sheet 10b relative to the sensing element 42. The continuous sheet 12 is then again advanced to abut against the trigger stop 30 on the gauge table 28 which has been previously adjusted so that the length of the continuous sheet 12 extending between the trigger stop 30 and the cutting shears 26 is equal to the desired length of the second heat transfer element sheet 10b to be cut. At this time, the cutting shears 26 is again activated to cut the continuous sheet 12 along a line 80' to provide a trailing edge 17 on the second heat transfer element sheet 10b. The sheet 10b is then removed from the gauge table 28 by the operator and stacked edgewise in the element basket 50 in juxtaposition to the first heat transfer element sheet 10a which had just been previously cut and packed in the element basket 50.

Figure 4:
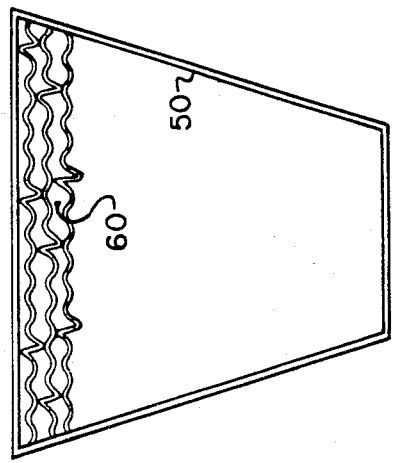
FIG. 4 is an end view of an element basket being stacked with the element sheet cut in accordance with the present invention.

The previously described steps are then repeated in succession with the control means 36 receiving signal 45 from the sensor assembly 40 each time the shears 26 cut the continuous sheet 12 of heat transfer element material. The sensor assembly 40 continually monitors the position of an upstream notch 24 in the continuous sheet 12 relative to the sensing elements 42 and continuously generates the signal 45 indicating which of the sensing elements 42 is in contact with the notch. Control means 36 compares the location of the notch in the sheet on which a leading edge is to be cut to the location of the notch in the sheet on which a leading edge has been just previously cut so as to insure that the distance from the leading edge of each sheet to the location of the sensed upstream notch therein is sufficiently different between adjacent sheets, i.e. greater than the minimum preselected value for such difference, thereby insuring that notches in adjacent sheets will not nest when the heat transfer element sheets are packed in the element basket 50 as shown in FIG. 4.

Figure 2A:
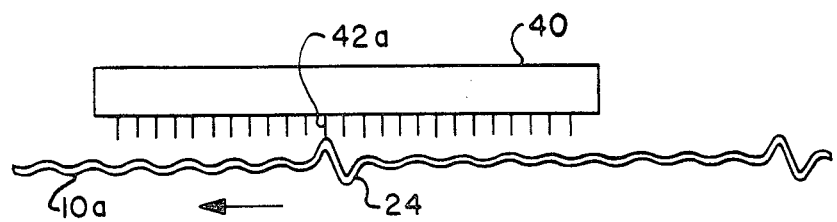
FIGS. 2a, 2b and 2c are side elevation views showing the various sensing means on the assembly line of FIG. 1 in contact with notches of first and second cut sheets.
Figure 2B:
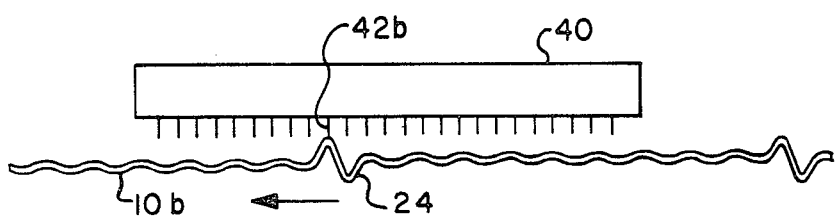

Referring now to FIGS. 1 through 3, an example will be given of the cutting process of the present invention in order to enhance the understanding thereof. To initiate the cutting process, the continuous sheet 12 of notched heat transfer element material is passed to the cutting shears 26 and the cutting shears 26 are activated to cut a leading edge 11 on the heat transfer element sheet 10a along a line 70. At the same time, a notch 24 on the first heat transfer element sheet 10a will be in contact with one of the sensing elements 42 of the sensor assembly 40, such as sensing element 42a as shown in FIG. 2a which corresponds to the twelfth sensing element upstream of the cutting shears 26. The location of this notch on the first heat transfer element sheet 10a at sensing element 42a would be stored by the control means 36 for subsequent use. The continuous sheet 12 is then advanced to abut the trigger stop 30 on the gauge table 28 which has been previously adjusted so that the length of the sheet 12 extending between the trigger stop 30 and the cutting shears 26 will be equal to the desired length of the element sheet 10a. The cutting shears 26 is then again activated to cut the sheet 12 along line 80 to produce the trailing edge 13 on the element sheet 10a. As the trailing edge 13 is cut on the element sheet 10a, control means 36 would again receive a signal from the sensor assembly 40 indicating the position of the next notch in the sheet 12 upstream of the cutting shears 26. This would be the first upstream notch in the next heat transfer element sheet 10b to be cut. As illustrated in FIG. 2b, the notch 24 in the next sheet 10b to be cut would be contacting a sensing element, such as sensing element 42b, at the time the trailing edge 13 is cut on the previous sheet 10a. As mentioned previously, if the distance between the sensed notched locations on sheet 10a and 10b stored by the control means 36 were greater than the preselected minimum tolerance on this distance, the control means 36 would send a signal 33 to the drive means for the rolls 22 to advance the sheet 12 to again abut the trigger stop 30 and cut along line 80' the trailing edge 17 on the element sheet 10b. In such a case, the leading edge 15 on the element sheet 10b would coincide with the trailing edge 13 on the element sheet 10a and there would be no wastage of heat transfer element material 12.

Figure 2C:
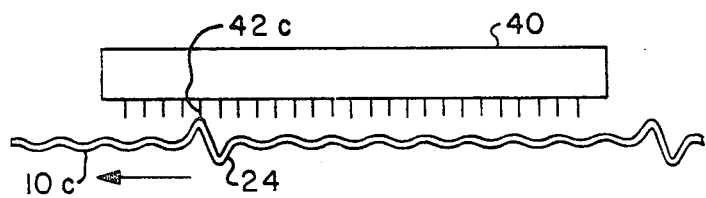

If, however, as illustrated in FIGS. 2a and 2b, the notch on the first heat transfer element sheet 10a was positioned at sensing element 42a, the twelfth sensing element upstream of the cutting shears 26, when the cutting shears 26 cut the leading edge 11 on the first sheet 10a, and the notch 24 in element sheet 10b was positioned at the notch 42b, the tenth notch upstream of the cutting shears 26, when the trailing edge 13 was cut on the element sheet 10a, the distance between the two notches would be two notch spacings or one-quarter inch. With a typical value for the minimum preselected distance between sense notches of five-eighths of an inch, the distance calculated by control means 36 between the notches of one-quarter inch would be less than the permitted minimum tolerance and control means 36 would again activate the drive means to advance the sheet 12 a small distance, such as five-eighths inch, i.e. the minimum preselected desired distance between notches, and the notch 24 in the sheet 10b would be moved to a position closer to the cutting shears 26 and now contact sensing elements 42c, which is illustrated in FIG. 2c as being the fifth element upstream of the cutting shears 26. The control means 36 would now again calculate the distance between the sense locations of the notch 24 in element sheet 10a and the notch 24 in element sheet 10b to be seven element spacings or seven-eighths of an inch. As this new calculated distance would be greater than the preselected minimum distance of five-eighths of an inch, the control means 36 would send a signal 35 to the cutting shears 26 to cut a leading edge 15 on sheet 10b along line 80. Control means 36 would then again advance the continuous sheet 12 to abut the trigger stop 30 which has been previously adjusted so that the length of the sheet 12 extending between the trigger stop 30 and the cutting shears 26 would be equal to the desired length of the element sheet 10b. The cutting shears 26 would then be again activated to cut along line 80' a trailing edge 17 on the element sheet 10b. The small piece of wasted material 90 of the sheet 12 located between the trailing edge 13 of sheet 10a and the leading edge of sheet 10b would be discarded.

In accordance with the present invention, the distance d2 from the line 70' along which the leading edge 15 of the element sheet 10B is spaced from the nearest notch 24 in the heat transfer element sheet 10b thereto differs in value from the distance dI between the line 70 along which the leading edge 11 of the element sheet 10a to cut and spaced from the nearest notch 24 thereto in heat transfer element sheet 10a by a distance greater than the preselected design tolerance. Therefore, when the element sheets 10a and 10b are stacked in juxtaposition in the element basket 50 as illustrated in FIG. 4, the notches in adajcent sheets are spaced from each other by an amount greater than the minimum preselected tolerance thereby precluding nesting of the notches in adjacent sheets.

I claim:

1. A method for forming and cutting heat transfer element sheets from a continuous sheet of material being passed beneath cutting shears positioned along the feed path of the material whereby the element sheets are cut in such a manner that nesting of adjacent element sheets when subsequently assembled within an element basket for a rotary regenerative heat exchanger is precluded, comprising:

a. drawing a sheet of heat transfer element material from a source thereof, the element material having a plurality of outwardly extending notches formed therein with the notches being spaced apart at equal intervals along the length of said sheet;

b. shearing a leading edge on a first subsheet along a first line disposed transversely across said notched sheet;

c. detecting the location of a first notch in said notched sheet upstream of the cutting shears and determining the distance therefrom to the first line along which the leading edge was sheared on said first subsheet;

d. advancing said notched sheet a desired length and shearing a trailing edge on said first subsheet along a second line parallel to and spaced from said first line whereby said first subsheet is sheared to fit into the element basket;

e. detecting the location of a second notch in said notched sheet upstream of the cutting shears and determining the distance therefrom to the second line along which the trailing edge was sheared on said first subsheet;

f. calculating the difference in distances between the location of the first notch in said notched sheet detected in step (c) and the location of the second notch in said notched sheet detected in step (e);

g. comparing the difference in distances calculated in step (f) to a preselected minimum tolerance indicative of the distance to be maintained between notches of adjacent element sheets in order to preclude nesting;

h. if the difference in distances calculated in step (f) is at least equal to said preselected minimum tolerance, proceeding directly to step (j);

i. if the difference in distances calculated in step (f) is less than said preselected minimum tolorence, advancing said notched sheet an amount about equal to said preselected minimum tolerance and shearing a leading edge along a third line disposed transversely across said notched sheet prior to proceeding to step (j); and j. repeating steps (c) through (i) in succession until the element basket is fully stacked with alternate juxtaposed subsheets.

* * * * *